Figure 1:
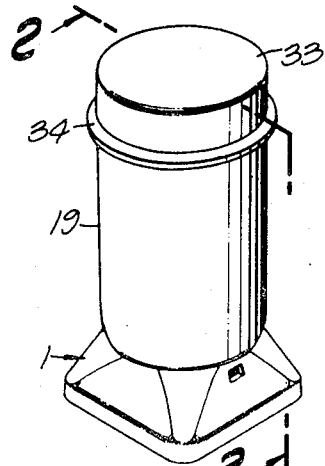

United States Patent [19]
Statham et al.

[11] 3,754,736
[45] Aug. 28, 1973

[54] FILM DRYER
[75] Inventors: Louis D. Statham; Walter H. Eisele, both of Oxnard, Calif.
[73] Assignee: Statham Instruments Inc., Oxnard, Calif.
[22] Filed: Dec. 6, 1971
[21] Appl. No.: 205,280

Related U.S. Application Data
[62] Division of Ser. No. 853,750, Aug. 28, 1969, Pat. No. 3,650,050.

[52] U.S. Cl. ............................................. 259/18
[51] Int. Cl. ............................................. B01f 7/08
[58] Field of Search ............... 259/18, 4, 2, 36, 259/60; 134/201, 117, 198

[56] References Cited
UNITED STATES PATENTS
1,745,466  2/1930  Anschicks .................. 134/201
3,259,373  7/1966  Ranson ........................ 259/4
3,510,108  5/1970  Yego ............................ 259/4
3,389,712  6/1968  John .......................... 134/198

*Primary Examiner*—Robert W. Jenkins
*Attorney*—Philip Subkow et al.

[57] ABSTRACT

A dryer assembly particularly designed for use by photographers who do their own developing, comprising a closed system isolated from the ambient environment, containing a desiccant space and an article-containing space suitable to receive film strips, and means to circulate the air in closed cycles through the article space, and desiccant contained in said desiccant space.

1 Claim, 8 Drawing Figures

Patented Aug. 28, 1973

3,754,736

2 Sheets-Sheet 1

Patented Aug. 28, 1973 3,754,736

2 Sheets-Sheet 2

FILM DRYER

This is a division of application Ser. No. 853,750 filed Aug. 28, 1969, now U.S. Pat. No. 3,650,050 issued Mar. 31, 1972.

This invention is directed to a dryer, particularly to a dryer adaptable for drying small, wetted, solid objects, such as, for example, developed film negatives.

It is an object of our invention to provide a device and method wherein the film may be air-dried speedily and in a closed limited ambient space which reduces and, ideally, eliminates the problem of dust contamination of the dried film.

We accomplish this objective by providing a closed circulating stream of air through a film-containing space and through a desiccant space, in cycles of air circulation.

When a non-dusting desiccant material is maintained in the desiccant space, no provision for filtering the circulating air to remove dust particles may be necessary. Where dusting of the desiccant may be present, a filter system may be positioned in the air stream to minimize and preferably prevent the entry of air-borne dust into the film chamber.

For convenience and economy of operation, the desiccant may be contained in a perforated, metallic canister, which may be removed from the unit. This permits of the regeneration of the desiccant in the canister by inserting the canister into a home oven, as will be more fully described below. Alternatively, the desiccant may be removed from the canister for regeneration and the regenerated desiccant replaced in the canister.

For purposes of easy assembly and disassembly, the unit is constructed in easily assemblable parts, which do not require clamps, nuts or bolts for their assembly or disassembly. This permits of economy of construction and assembly and facilitates storage and cleaning.

The dryer, in its smaller sizes, suitable for amateur and professional photographers who do their own development, may be made of plastic materials, as will be understood by those skilled in the art from the description herein give. For this purpose, we have provided features of construction which will facilitate the construction of the unit from plastic materials, as, for example, by injection molding, and which will also protect the plastic material from damage in use.

As stated above, the dryer forms one element of the procedure for producing a developed film negative suitable for printing. A necessary feature in this process is the washing of the film after it is removed from the film developing tanks. We have provided a suitable film washer which is assemblable with a dryer and thus, with the dryer, provides a system for conveniently and rapidly washing and drying film negatives.

We provide a washing cup which will permit of the circulation of water over a developed film and will aid in an efficient washing of the film.

In order that the system have all of its parts available when needed, and to permit easy shipment and storage in a reduced space volume, we make the cup of dimensions to nest in the interior of the dryer and be assemblable with the dryer.

These and other objects of our invention will be further understood by reference to the drawings, which illustrate a preferred mode of carrying out our invention.

Figure 3:
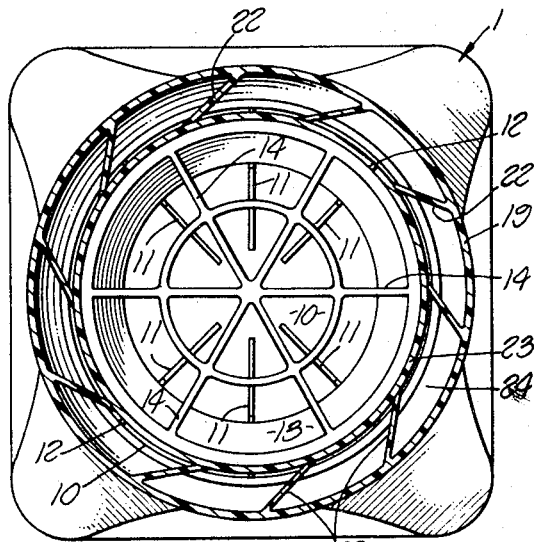
Figure 2:
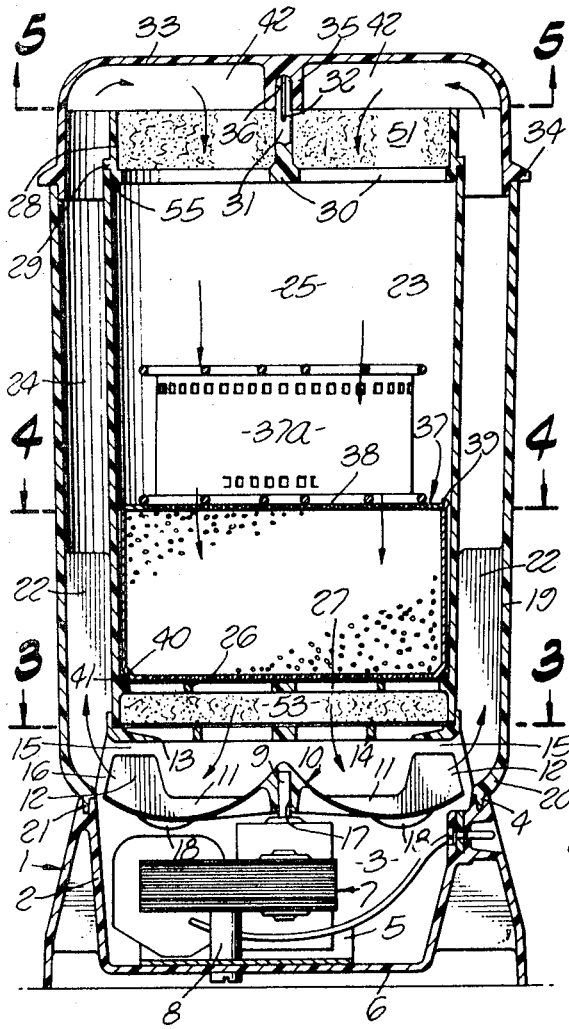
Figure 4:
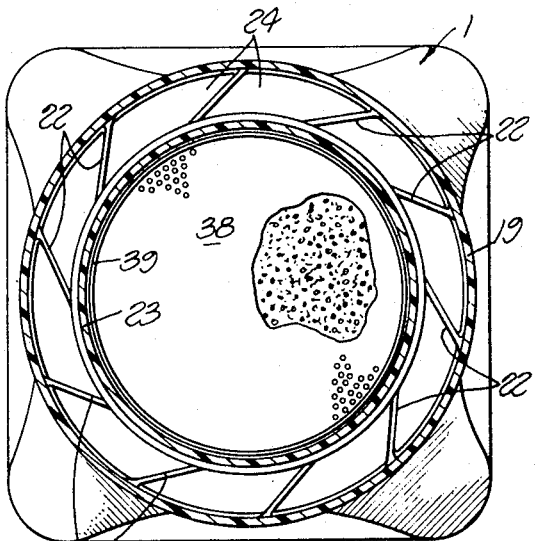
Figure 6:
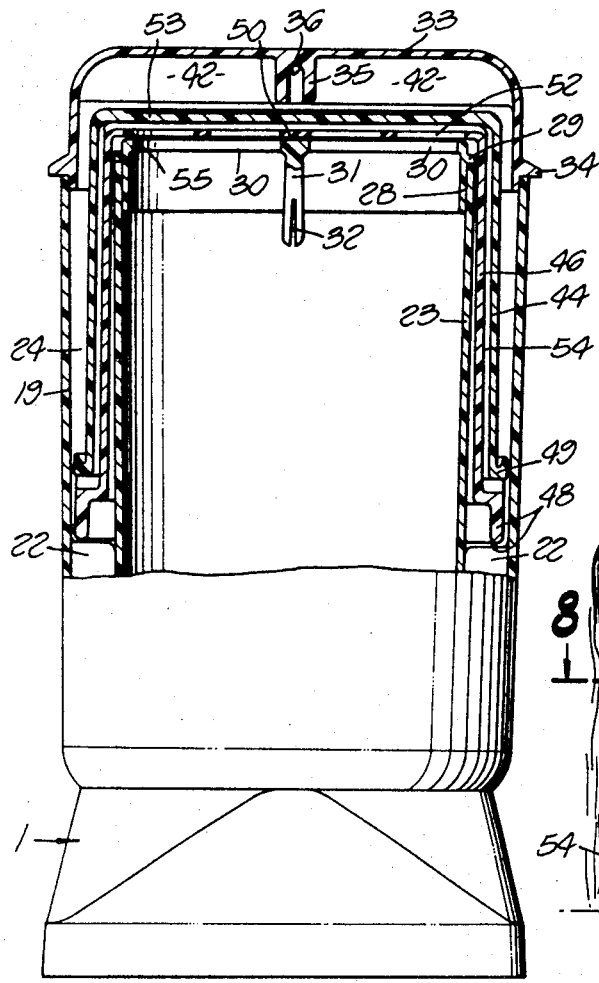
Figure 7:
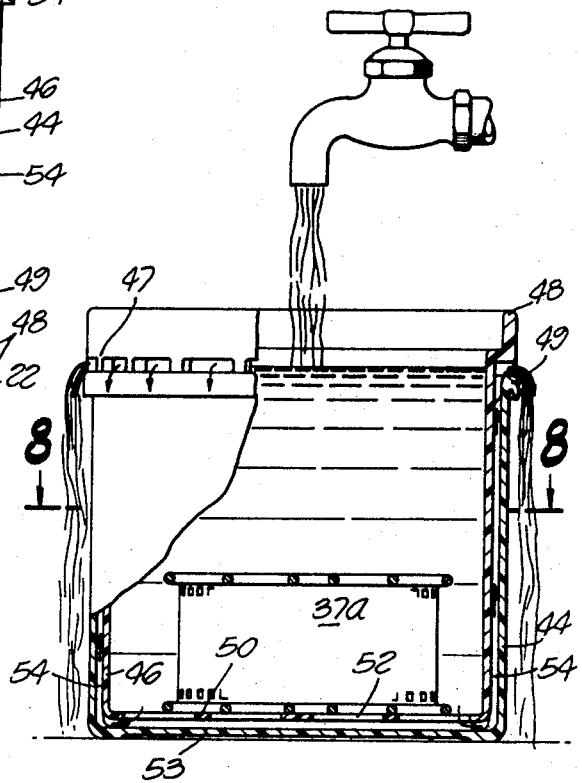
Figure 8:
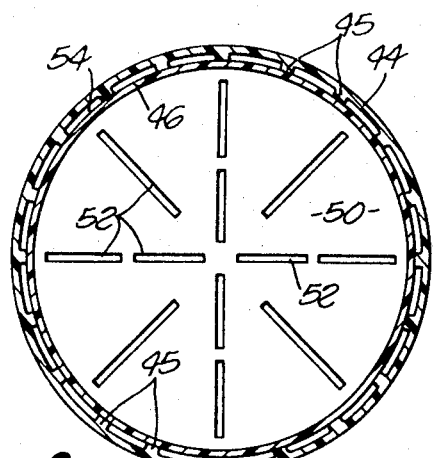
Figure 5:
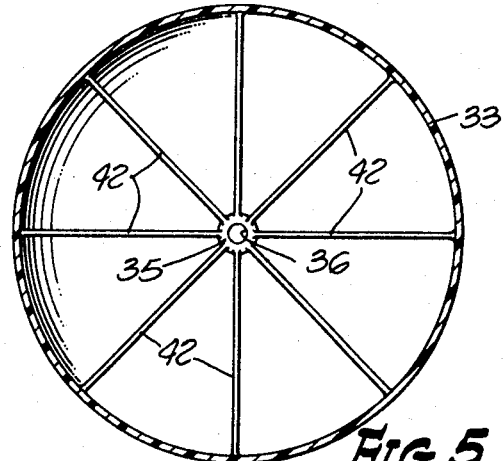

FIG. 1 is a perspective view of the assembled dryer;

FIG. 2 is a section taken along line 2—2 of FIG. 1;
FIG. 3 is a section taken on line 3—3 of FIG. 2;
FIG. 4 is a section taken on line 4—4 of FIG. 2;
FIG. 5 is a section taken on line 5—5 of FIG. 2;
FIG. 6 is a section similar to FIG. 2 but showing the storage of the washing cup and the desiccant canister removed;
FIG. 7 is a vertical sectional view of the washing cup showing the film being washed; and
FIG. 8 is a section taken on line 8—8 of FIG. 6 with the film removed.

As will be seen from FIGS. 1 and 2, the base 1 is formed of a circular wall 2 and an interior cup space 3. The top surface of the wall of 2 carries a circular groove 4. A U-shaped bracket 5 is held in place in the bottom 6 of the cup 3 by a pair of studs 8 (one only shown in FIG. 2), which carry the motor 7. This feature is of value in distributing the heat generated by the motor 7. The heat transmitted to the studs 8 is distributed over a large area of the base. Where the base is made of a plastic material, this insures that the plastic is not heated to its softening point or otherwise damaged by heat. The bracket 5 acts to distribute the stress which is generated by the motor action. In the absence of this stress and temperature distribution, there may be an excessive concentration of stress and heat at the base adjacent the bolt.

The shaft 9 driven by the motor 7 carries an impeller 10. The nozzle of the impeller is formed by shaping the ends 12 of the impeller vanes 11 so that they are spaced from the bottom edge of the inwardly extending flange 13 of the spider 14, to be described more fully below. This arrangement introduces a sufficient air resistance in the gap 15 to limit the recirculation of the air from the volute 16, to be described more fully below, back to the eye of the impeller 10.

The impeller 10 is mounted on the shaft 9 by means of an interference fit and/or adhesive bond, to permit of an adjustment of the impeller on the spline 12, to adjust the clearance 15.

The impeller vanes 11 are formed with the blades 18 positioned on the underneath side of the impeller vanes 11, to act as fans to help cool the motor 7. The cylindrical case 19 is formed with curved ends 20 and a depending circular ridge 21, which fits into the groove 4.

The vanes 22 are connected at spaced intervals to the case 19 and may be integral therewith. The vanes 22 extend inwardly for a distance equal to the annulus between the interior of the case 19 and the exterior of the inner chamber 25. The vanes extend along chords at non-rectangular angles to the radius of the case 19. That is, the vanes 22 form an obtuse angle with the radius which intersects the base of the vanes 22 at the inner surface of 19, as is shown in FIGS. 3 and 4.

The spider 14 is connected to the vanes 22 and may be formed integrally therewith.

When the structure is made of plastic by an injection molding process, the volute form of the end of the case and the form of the spider, formed integrally with the wall of 19, facilitate the production of the article by injection molding process.

Mounted in the interior of the case 19 is a film and desiccant chamber 25. The circular wall 23 of the chamber 25 is centered by the interior ends of the vanes 22 to form the annular space 24 segmented by the vanes 22. The bottom of the circular wall 23 sits on the receiving flange 13 of the spider 14. The end of the wall 23, coacting with flange 22 and the curved end of the wall of 19, forms the volute section of the impeller and is the entry into the annular space 24. The spider 26 forms the entry to the eye of the impeller.

The spider 26 is connected to the wall 23 and forms the bottom of the chamber 25 and the end of the wall 23. The arrangement provides for a space 27, whose function is described below. The spider 26 may be formed integrally with the wall 23.

Mounted on the upper end of 23 is a cup-shaped filter retainer 28. The cup-shaped retainer 28 carries near one end thereof a flange 29, which fits on the end of the wall 23, to form a suitable seal with the upper end of 23. The spider 30 is mounted and connected to the end of the retainer 28 and may be formed integrally therewith. The spider carries a central pin 31 which is slit at 32. The lid 33 carries at one end thereof a flange 34 and an internal boss 35, which depends from the inner surface of the lid 33. The boss 35 is formed with a socket 36 to receive pin 31.

The canister 37, preferably of metal, has a perforated bottom and a perforated cover 38, which is held in place in the grooves 39. A semicircular bail is hinged onto this cover to facilitate handling of the canister. The height of the canister is thus less than the height of the wall 23, providing for space in 25 for the positioning of material to be dried, for example, film, as shown at 37a. A desiccant material, preferably granular or pelleted and non-dusting, is contained in the canister. The canister has chamfered corners 40, which rest on a metallic ring 41. Film or other material to be dried may be positioned on the canister.

When the desiccant material is substantially non-dusting, the filters need not be used. However, when required or used as a precautionary matter, space 27 is provided between spiders 14 and 26 and in the retainer 28 for the positioning of such filters, shown at 51 and 53. Various dust filters are available for such use as, for example, glass fibre or other fibre mats. We prefer, however, to use urethane foam, which has suitable porosity. Those skilled in the art of filtering air are familiar with air filters and can make the desired choice.

The desiccants which are readily available commercially include pelleted montmorillonite and alumina, pelleted synthetic zeolites, and silica gel.

We desire to employ a desiccant which, when in equilibrium with air at a relatively low humidity, can contain a substantial percentage of its weight in water. Further, we prefer to use a desiccant which may be regenerated to be active as a desiccant in the above structure when heated to a temperature of about 400° F. This will permit the regeneration of the desiccant by placing the cartridge in a household oven. For this reason, in our preferred embodiment we employ dehydrated alumina.

The assembly and disassembly of the above structure will be evident from the above description. The air circulation, as will be observed, is up the annulus 24 and downward through the chamber inside the cylinder 25, picking up moisture. The moist air passes through the canister 37 and the contained desiccant and is dried and recirculated as described above. When it is desired to regenerate the desiccant, the canister may be removed and the desiccant dried.

The various features of construction are provided to facilitate ease of fabrication, and particularly when the structure is formed of plastic by injection molding.

Other features are provided to obtain an efficient functioning of the device.

To provide for ease of manufacture by injection molding, the structure is made of discrete parts, as described above. The provision of the curved end of 19, which coacts to form the volute, also facilitates the molding of the cylinder by injection molding. The integral construction of the spider 14, acting with the vanes 22 in the wall of the cylinder 19, permits the use of an injection molding die with a central delivery of the plastic. The channels in the die forming the spider and the vanes 22 permit of the delivery of the plastic from a central injection point and the distribution of the plastic in the die to develop the vanes 22 and the wall 19, as well as the spider 14.

A similar result is obtained by providing the interior container 23 with the spider 26 formed integral with the wall 23. A similar function is provided by the radial vanes 42 integral with the top of the cap, which facilitate the flow of plastic from the central injection point, where the boss 35 is developed, to the outer portions of the cap 33, to develop the wall of 33.

The integral construction of the spider 30 and retainer 28 also provides for a similar form of injection die, with a central injection point, permitting the movement of plastic from the central injection point to the wall sections of the die, where the wall of 28 is developed.

The integral construction of the spider 30 and the wall of 28 has an additional function. As will be seen from FIG. 2, it is desirable, for reasons to be more fully described below, that the flange 29 seat on the end of the wall 23. This minimizes air leaks at this point and directs the air through the filter 51 when it is employed. The spider 30 has substantial resilience, so that when the lid 33 is fitted in place and the slotted pin 31 is pressed in place into the socket 36, the downward pressure imposed on pin 31 deflects the spider 19 so that any inaccuracy in tooling will not cause a bottoming of the pin 31 in the socket 36 to hold the flange 29 away from the end of the wall of 23 and thus provide for an air leak.

The socket 36 and the coacting slit pin 31 present sufficient friction to prevent the separation of the parts when the pressure on 33, used in placing the cap in position, is released.

A further sealing provision is provided by means of the groove 4 and the ridge 21 at the base.

The angular position of the vanes 22 ensures that the rotating air discharging into the volute section is converted from a rotary into a longitudinal motion in the annulus 24. The vanes 22 also act to minimize turbulence in this annular space.

The canister 37 fits loosely into the cylindrical space 25 and is seated on the metallic ring 41. The major function of the ring, coacting with the chamfered edge 40, is to minimize the transfer of heat from the hot canister to the plastic. This prevents damage of the plastic if a hot canister, taken from the oven, is inserted while it is too hot.

The chamfered edge 40, acting with the metallic ring, provides substantially a line contact between the plastic and the canister. The canister is of a diameter such that when inserted it is spaced close to the wall 23, to form a restricted passageway to minimize circulation of air between the canister wall and the wall 23. This limits and effectively prevents a by-pass passageway for the circulating air.

As has been stated above, we have provided means for storing a washing cup which is used in conjunction with a dryer. The washing cup may be any beaker of suitable size to fit in the manner described below, preferably designed to permit circulation of water through the beaker and over the film 37a or other material to be washed in the beaker. The arrangement described below simplifies storage and shipment and ensures that the entire washing and drying apparatus will be at hand when it is needed. We prefer, however, to provide a washing cup of the design shown in FIGS. 6, 7 and 8. The washing cup there shown is a highly efficient washing apparatus which does not need any hose connection to a water supply and may be used with any faucet to produce a circulation of wash water over film 37a positioned in the cup.

We have shown in FIG. 6 how the structure shown in FIGS. 1–5 may be adapted for storage of the washing cup. The cup which we prefer is shown in FIGS. 6, 7 and 8 and is in two parts. The outer cup 44 carries internal longitudinal ribs 45. The inner cup 46 is of outer diameter sufficient to fit into the outer cup against the ribs 45. The inner cup carries a crenelated flange 47 which seats on the upper end of the outer cup 44. The top 48 of the inner cup is positioned above the level of the top end 49 of the outer cup 44. The bottom 50 of the inner cup is slotted at 52 and is spaced from the solid bottom 53 of the outer cup 44.

As will be evident, material such as developed film strips may be placed into the inner cup. The cup may be set under a faucet, and water entering into the inner cup will fill the cup to a height such that the hydrostatic pressure of the water is sufficient to move the water through the slots 52, through the annular space 54 between the ribs 45, through the notches formed between the crenelations 47, and over the top 49 of the outer cup.

Upon upending of the cup, the water will drain through crenelations.

When it is desired to store the cups in the dryer, the retainer is inverted, as shown in 6, and the cups are nested with the bottom of the inner cup resting on the rim 55 of the retainer, which in the operating position of FIG. 2 was inserted into 23. The vanes 22 are designed so that their extent permits the inner cup to clear the ends of the vanes.

While we have described particular embodiments of our invention for the purpose of illustration, it should be understood that various modifications and adaptations thereof may be made within the spirit of the invention, as set forth in the appended claims.

We claim:

1. A washing device comprising an inner and outer cup, the outer cup carrying longitudinal ribs on the inner surface of said outer cup, the inner cup fitting into the outer cup and spaced from said outer cup by said ribs to provide segmented annular space with water passageways between the outer and inner cup and said ribs, the bottom of the inner cup being slotted to provide water passage therethrough, the wall of said inner cup at its upper end carrying a depending crenelated flange, adapted to seat on the upper end of the outer cup, whereby water passage is provided through the bottom of said inner cup and upward between said cups, to discharge through the notches provided by the crenelations of the top of said outer cup.

* * * * *